US012418972B2

(12) United States Patent
Tae et al.

(10) Patent No.: US 12,418,972 B2
(45) Date of Patent: Sep. 16, 2025

(54) CONFOCAL CHROMATIC METROLOGY FOR EUV SOURCE CONDITION MONITORING

(71) Applicant: KLA Corporation, Milpitas, CA (US)

(72) Inventors: Patrick Tae, San Jose, CA (US); Caijun Su, San Jose, CA (US); Ravichandra Jagannath, Milpitas, CA (US); Brian Ahr, Ann Arbor, MI (US)

(73) Assignee: KLA Corporation, Milpitas, CA (US)

( * ) Notice: Subject to any disclaimer, the term of this patent is extended or adjusted under 35 U.S.C. 154(b) by 485 days.

(21) Appl. No.: 17/944,715

(22) Filed: Sep. 14, 2022

(65) Prior Publication Data

US 2024/0090110 A1 Mar. 14, 2024

(51) Int. Cl.
*H05G 2/00* (2006.01)
*H05H 1/46* (2006.01)

(52) U.S. Cl.
CPC ......... *H05G 2/0027* (2024.08); *H05G 2/0084* (2024.08); *H05H 1/46* (2013.01); *H05H 2240/20* (2013.01)

(58) Field of Classification Search
CPC .......... H05G 2/008; H05G 2/006; H05H 1/46; H05H 2240/20
USPC .......................................... 250/492.1, 504 R
See application file for complete search history.

(56) References Cited

U.S. PATENT DOCUMENTS 9,544,984 B2 1/2017 Bykanov et al.
9,918,375 B2 3/2018 Kuritsyn et al.
10,021,773 B2 7/2018 Kuritsyn et al.
2009/0059232 A1 3/2009 Hellstrom et al.
2017/0142818 A1* 5/2017 Kuritsyn ............... G02F 1/0327
2017/0276615 A1* 9/2017 Fresquet ................. H01L 22/12
2020/0033121 A1 1/2020 Wouters et al.
2021/0310717 A1 10/2021 Seelinger et al.
2022/0210901 A1* 6/2022 Xu ...................... G03F 7/70041

FOREIGN PATENT DOCUMENTS

KR 20210024675 A 3/2021

OTHER PUBLICATIONS

Geram, "Chromatic Confocal Sensor Working Principle," https://www.geramtech.com/chromatic-confocal-sensor-working-principle/ (downloaded Aug. 17, 2022).
J. Salzberger et al., "Sensors for any circumstance," Automation Technologies 5, 2014.
Micro-Epsilon, "Confocal sensors for displacement, distance, position, and thickness," https://www.micro-epsilon.com/displacement-position-sensors/confocal-sensor/ (downloaded Jul. 4, 2022).
PCT/US2023/031802, International Search Report, Dec. 26, 2023.
PCT/US2023/031802, Written Opinion of the International Searching Authority, Dec. 26, 2023.

* cited by examiner

*Primary Examiner* — Michael Maskell
(74) *Attorney, Agent, or Firm* — Huse IP Law

(57) ABSTRACT

A light source includes a rotatable drum to be coated with xenon ice and illuminated by a laser beam to produce a plasma. The drum may also be translatable. The light source further includes a confocal chromatic sensor to measure distances from the confocal chromatic sensor to the rotatable drum. The confocal chromatic sensor may include a sensor head to focus light onto the rotatable drum and to detect reflected light from the rotatable drum. The sensor head and the rotatable drum may be disposed within a vacuum chamber.

22 Claims, 10 Drawing Sheets

CONFOCAL CHROMATIC METROLOGY FOR EUV SOURCE CONDITION MONITORING

TECHNICAL FIELD

This disclosure relates to metrology for a drum coated with xenon ice in an extreme ultraviolet (EUV) light source, and more specifically to using a confocal chromatic sensor for such metrology.

BACKGROUND

An EUV light source may include a rotating drum that has an outer surface coated with xenon (Xe) ice (i.e., solid Xe). A plasma that emits EUV light is formed by illuminating the Xe ice with a laser beam. Optical imaging using a camera may be performed to determine parameters of the Xe ice, such as the thickness and surface quality of the Xe ice. The camera images sections of the Xe ice and image-processing algorithms extract relevant information from the images. The extracted information is limited, however, in spatial resolution and bandwidth. Identifying parameters of the Xe ice (e.g., for real-time feedback) using optical imaging is thus challenging.

SUMMARY

Accordingly, there is a need for improved systems and methods of monitoring Xe ice on a rotating drum in an EUV light source. Such systems and methods may involve a confocal chromatic sensor, which is also referred to simply as a confocal sensor.

In some embodiments, a light source includes a rotatable drum to be coated with Xe ice and illuminated by a laser beam to produce a plasma. The light source also includes a confocal chromatic sensor to measure distances from the confocal chromatic sensor to the rotatable drum.

In some embodiments, a method of operating a light source includes rotating a drum, coating the drum with Xe ice while rotating the drum, and illuminating the drum with a laser beam to produce a plasma while rotating the drum with the drum coated with the Xe ice. The method also includes monitoring the drum using a confocal chromatic sensor to detect defects in the Xe ice on the drum while illuminating the drum with the laser beam and shutting off the laser beam in response to detecting a defect in the Xe ice on the drum.

BRIEF DESCRIPTION OF THE DRAWINGS

For a better understanding of the various described implementations, reference should be made to the Detailed Description below, in conjunction with the following drawings.

Like reference numerals refer to corresponding parts throughout the drawings and specification.

DETAILED DESCRIPTION

Reference will now be made in detail to various embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
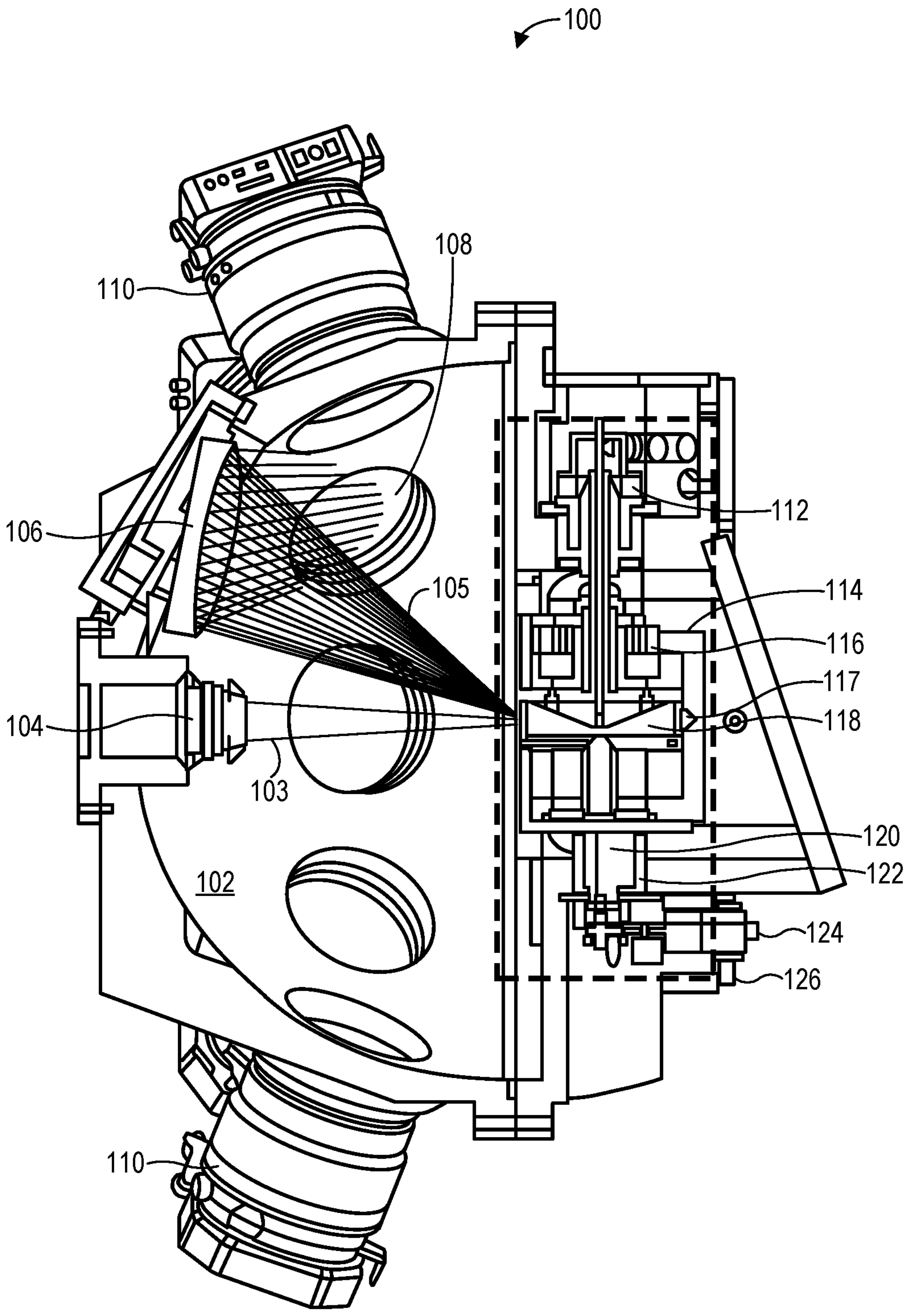
FIG. 1 is a cross-sectional side view of an EUV light source in accordance with some embodiments.

FIG. 1 is a cross-sectional side view of an extreme ultraviolet (EUV) light source 100 in accordance with some embodiments. The EUV light source 100 includes a vacuum chamber 102 (e.g., a billet aluminum chamber). Vacuum pumps 110 (e.g., turbo pumps) provide a vacuum in the vacuum chamber 102. A laser beam 103 is introduced into the vacuum chamber 102 through a laser objective 104 and accompanying pellicle. The laser objective 104 focuses the laser beam 103 on the outer surface of a drum 118 (e.g., a copper drum), which is coated with xenon (Xe) ice (i.e., solid Xe). The laser beam 103 illuminates the drum 118, striking the Xe ice on the outer surface of the drum 118. When the laser beam 103 strikes the Xe ice on the outer surface of the drum 118, it sparks a plasma that emits EUV light 105. A mirror 106 collects a portion of the EUV light 105 and directs the collected EUV light 105 through a window 108 in the vacuum chamber 102. The drum 118 is rotated and also vertically translated to allow different regions (i.e., portions) of Xe ice on its outer surface to be exposed to the laser beam 103. Xe may be sprayed onto the outer surface of the drum 118 by a sprayer 117 as the drum 118 rotates and translates, to maintain the coating of Xe ice.

A feed-through assembly 112 provides liquid nitrogen to the interior of the drum 118, to keep the surface of the drum 118 cold and thus maintain the coating of Xe ice on the drum 118. The liquid nitrogen boils away during operation of the EUV light source 100. The feed-through assembly 112 exhausts the resulting nitrogen gas from the drum 118.

The drum 118 is housed in a drum assembly 114, which is coupled to the feed-through assembly 112. The drum assembly 114 also includes a rotational motor 116 that rotates the drum 118. The rotational motor 116 is coupled to the drum 118 independently of the feed-through assembly 112. The drum assembly 114 further includes the sprayer 117. The drum assembly 114 has a water-cooled drum cover that receives water from a water-cooling input 126. Below the drum assembly 114, and thus below the drum 118, is a translational motor 120 that translates the drum 118 linearly in the vertical direction (i.e., moves the drum 118 up and down). The translational motor 120 is also coupled to the drum 118 independently of the feed-through assembly 112. A corresponding linear-stage actuator 124 actuates the translational motor 120. Also situated below the drum assembly 114 are weight-compensating bellows 122.

For the EUV light source 100 to operate properly, the coating of Xe ice on the drum 118 should be free of defects. For example, the Xe ice should have a minimum thickness everywhere on the drum 118. The minimum thickness should be sufficient to ensure that the laser beam 103 does not strike the bare outer surface of the drum 118; such a strike could damage the drum 118 and result in contamination of the vacuum chamber 102. The Xe ice also should have a relatively uniform thickness (e.g., to within a specified degree of uniformity). To allow such a coating of Xe ice to be achieved, the bare outer surface of the drum 118 on which the Xe will be deposited should be smooth. A confocal chromatic sensor (i.e., a confocal sensor) is used to monitor the drum 118, as coated with Xe ice and/or with its bare outer surface exposed, to determine whether these criteria are met.

Figure 2:
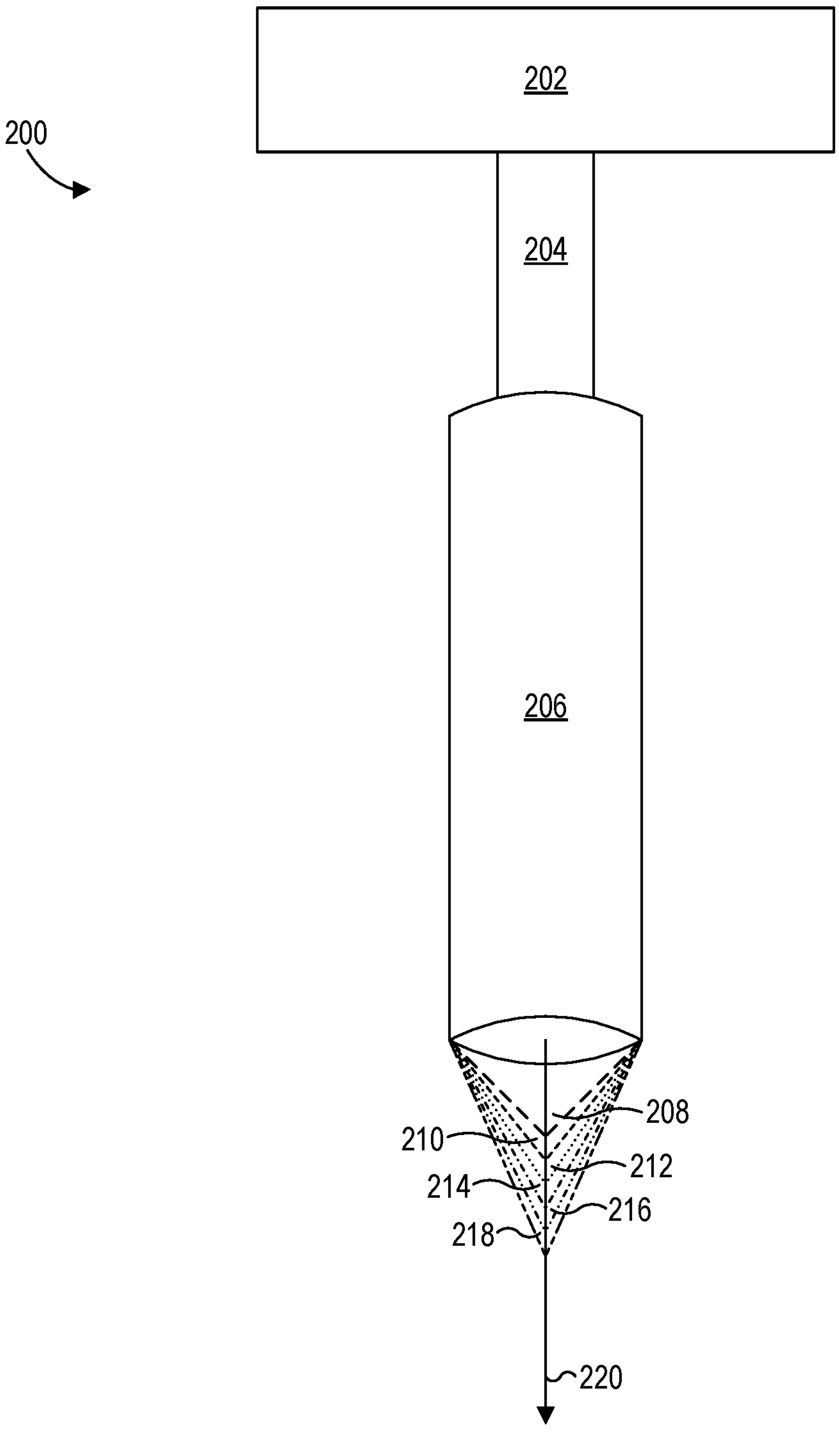
FIG. 2 shows a confocal chromatic sensor in accordance with some embodiments.

FIG. 2 shows a confocal chromatic sensor 200 in accordance with some embodiments. The confocal chromatic sensor 200 includes a sensor head 206, a controller 202, and an optical fiber 204 coupled between the sensor head 206 and the controller 202. The controller 202 includes circuitry to control the sensor head 206 and also includes a light source (e.g., one or more light-emitting diodes (LEDs)) to generate broadband light (e.g., white light) to be provided to the sensor head 206. The broadband light is transmitted from the controller 202 to the sensor head 206 through the optical fiber 204. The sensor head 206 includes optics to disperse the broadband light and emit the dispersed light, focusing the emitted light along an optical axis 220 such that different wavelengths of the emitted light have different focal lengths. In the example of FIG. 2, the dispersed, emitted light includes violet light 208, blue light 210, green light 212, yellow light 214, orange light 216, and red light 218. The focal length of the violet light 208 is shorter than the focal length of the blue light 210, which is shorter than the focal length of the green light 212, which is shorter than the focal length of the yellow light 214, which is shorter than the focal length of the orange light 216, which is shorter than the focal length of the red light 218.

If an object is placed in front of the tip of the sensor head 206 (i.e., in front of the end of the sensor head 206 from which the dispersed light is emitted), such that the object intersects the optical axis 220, the sensor head 206 receives light that was originally emitted by the sensor head and then reflected from the object. Based on the wavelengths of the received light, the confocal chromatic sensor 200 determines the distance from the sensor head 206 (e.g., from the tip) to the object. The confocal chromatic sensor 200 may also determine the reflectivity of the object and the roughness (or equivalently, the uniformity) of a portion of the surface of the object illuminated by the emitted light from the sensor head 206. The confocal chromatic sensor 200 operates at a sampling rate. In some embodiments, the sampling rate is in a range between 100 Hz and 70 kHz.

Figure 3A:
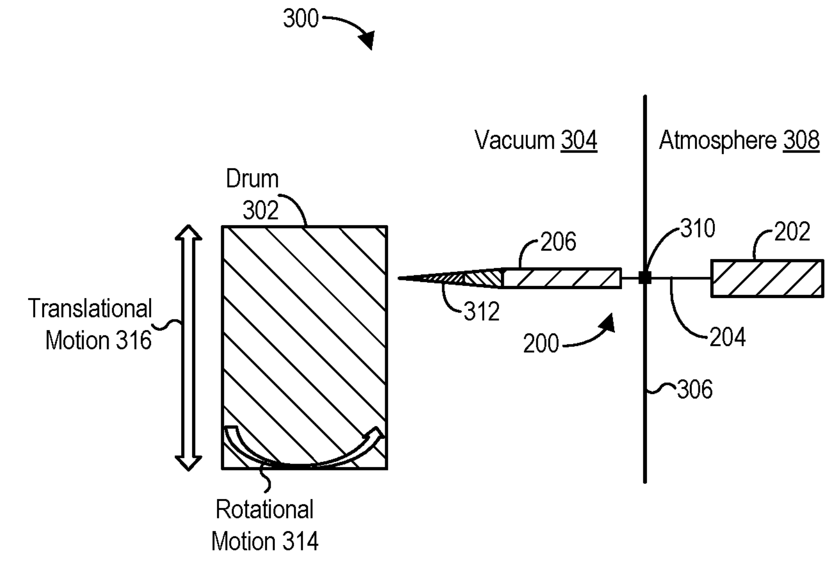
FIGS. 3A and 3B show components of an EUV light source in accordance with some embodiments.
Figure 3B:
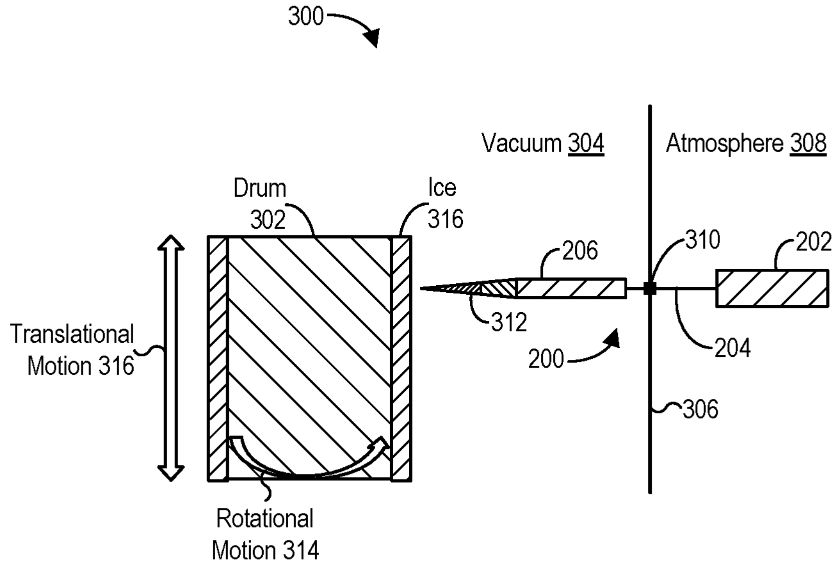

FIGS. 3A and 3B show components of an EUV light source 300 (e.g., EUV light source 100, FIG. 1) in accordance with some embodiments. The components include a drum 302 (e.g., drum 118, FIG. 1) and a confocal chromatic sensor 200 (FIG. 2) with a sensor head 206, optical fiber 204, and controller 202. The drum 302 is rotatable about a central vertical axis, such that it can achieve rotational motion 314, and is translatable in the vertical direction, such that it can achieve translational motion 316. In FIG. 3A, the outer surface of the drum 302 is bare and thus exposed. In FIG. 3B, the outer surface of the drum 302 is coated with Xe ice 316. The drum 302 as coated with the Xe ice 316 may be illuminated by a laser beam (e.g., laser beam 103, FIG. 1) to produce a plasma that emits EUV light.

The drum 302 and sensor head 206 are disposed in a vacuum chamber 304 (e.g., in the vacuum chamber 102). The controller 202 is disposed outside of the vacuum chamber 304 (e.g., outside the vacuum chamber 102), in atmosphere 308. The optical fiber 204, which provides broadband light from the controller 202 to the sensor head 206, passes through a feed-through 310 in a wall 306 of the vacuum chamber 304. Accordingly, the optical fiber 204 is disposed partially outside the vacuum chamber 304 and partially inside the vacuum chamber 304.

Figure 4A:
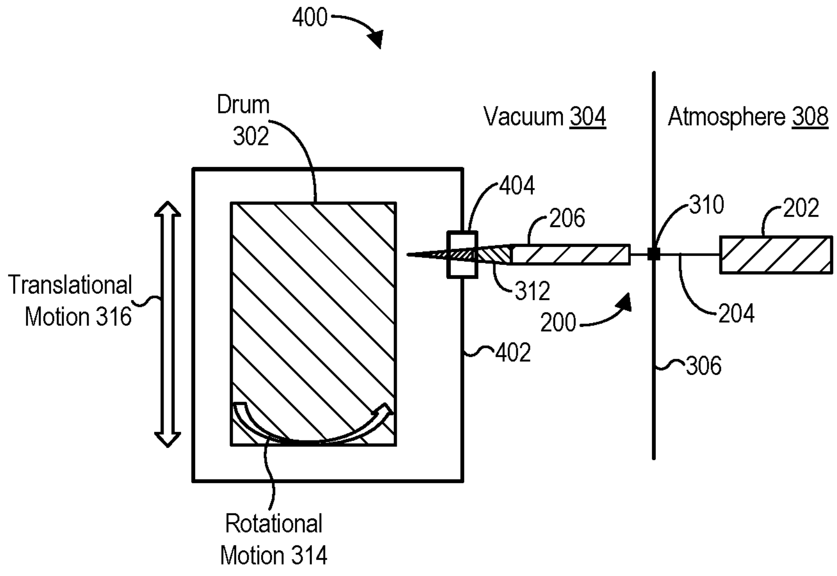
FIGS. 4A and 4B show components of an EUV light source, including the components of the EUV light source of FIGS. 3A-3B and a casing in which the rotatable drum of FIGS. 3A-3B is disposed, in accordance with some embodiments.
Figure 4B:
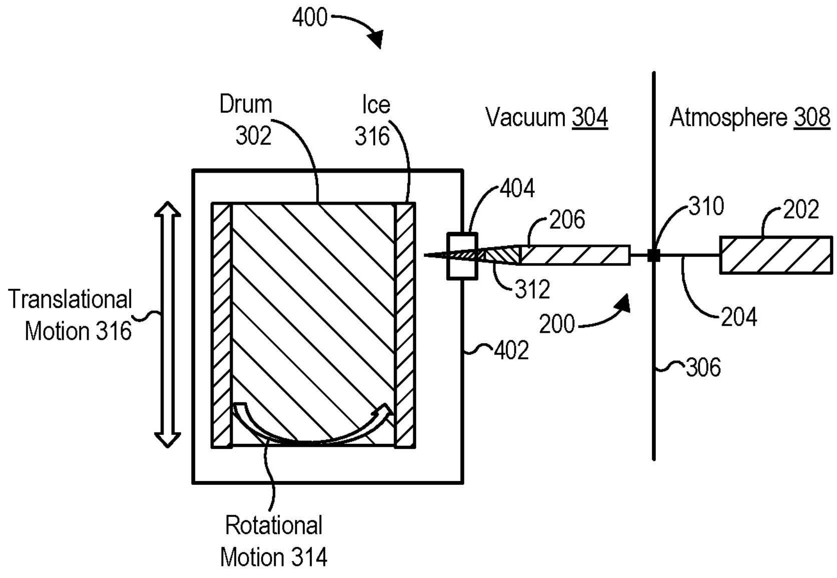

FIGS. 4A and 4B show components of an EUV light source 400 that is an example of the EUV light source 300 (e.g., and of the EUV light source 100, FIG. 1) in accordance with some embodiments. The components of the EUV light source 400 include the components of the EUV light source 300 and further include a casing 402 that encloses the drum 302. In some embodiments, the casing 402 is part of the drum assembly 114 (FIG. 1). While the drum 302 is disposed within the casing 402, the sensor head 206 is disposed outside of the casing 402 (but within the vacuum chamber 304). The casing 402 has a window 404 situated between the drum 302 and the sensor head 206. Light 312 from the sensor head 206 passes through the window 404 to the drum 302, and corresponding reflected light from the drum 302 passes through the window 404 to the sensor head 206. The casing 402 accommodates a pressure differential between the region inside the casing 402 and the region outside the casing 402 but inside the vacuum chamber 304. For example, the region inside the casing 402 has a higher pressure during operation of the EUV light source 400 than the region outside the casing 402 but inside the vacuum chamber 304.

Figure 10A:
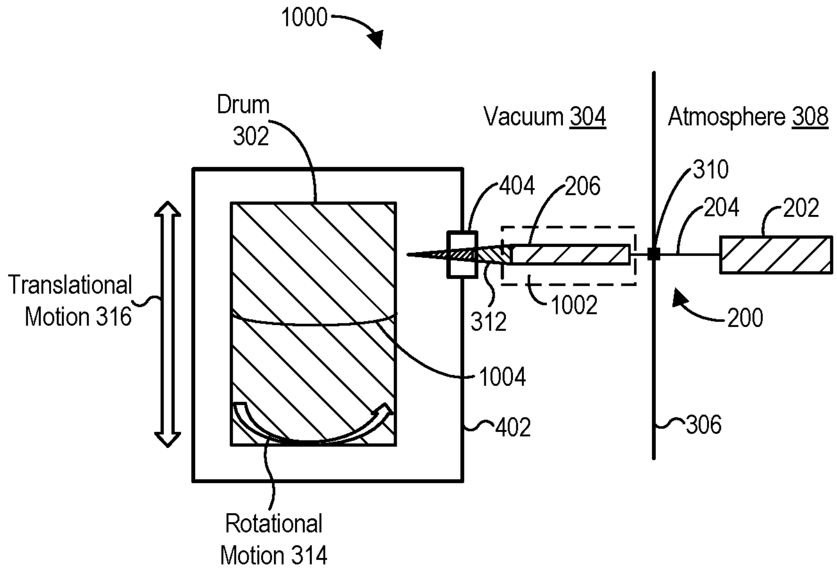
FIGS. 10A and 10B show components of an EUV light source, including the components of the EUV light source of FIGS. 4A-4B and a motorized translation stage on which the sensor head is mounted, in accordance with some embodiments.
Figure 10B:
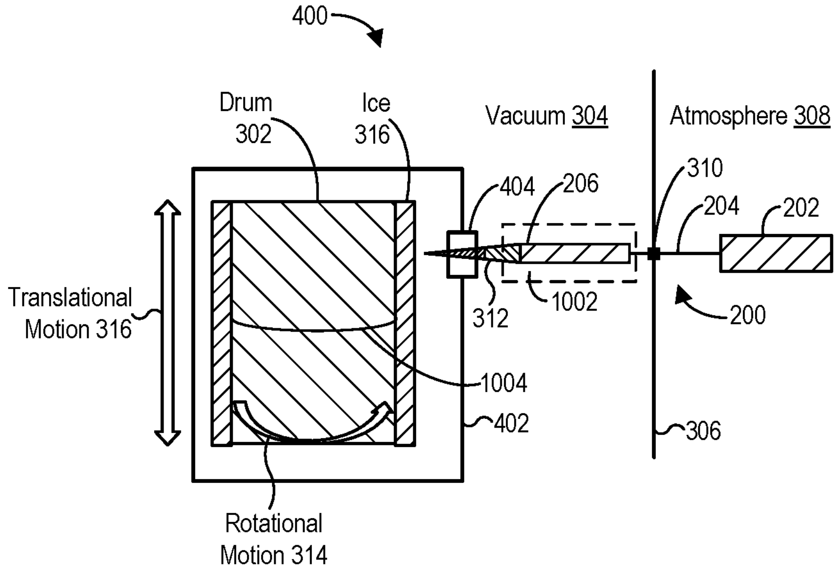

FIGS. 10A and 10B show components of an EUV light source 1000 that is an example of the EUV light source 400 (e.g., and of the EUV light source 100, FIG. 1) in accordance with some embodiments. The components of the EUV light source 1000 include the components of the EUV light source 400 and further include a motorized translation stage 1002 on which the sensor head 206 is mounted. The motorized translation stage 1002 is disposed within the vacuum chamber 304. The motorized translation stage 1002 is translatable, and thus may translate the senor head 206 vertically (e.g., in accordance with the translation motion 316 of the drum 302) and/or horizontally (i.e., to move the sensor head toward or away from the drum 302 and the window 404). For example, the motorized translation stage 1004 may translate vertically to align the sensor head 206 with the laser spot (e.g., the spot at which the laser beam 103 illuminates the Xe ice 316), such that the sensor head 206 monitors portions of the Xe ice 316 that are newly illuminated by the laser beam (e.g., with the newly illuminated portions rotating from the laser spot to the field of view of the sensor head 206 in less than one full rotation of the drum 302). This alignment between the sensor head 206 and the laser spot allows the sensor head 206 to detect defects (e.g., craters) in the Xe ice 316 that are newly induced by the laser beam. In some embodiments, to achieve this alignment, the motorized translation stage 1004 adjusts the vertical position of the sensor head 206 with respect to the vertical position of the drum 302 to account for the translational velocity of the drum 302 and the relative angular positions of the laser spot and the sensor head 206 around the drum 302. The position of the motorized translation stage 1002 may be measured using an encoder (not shown).

In some embodiments, the drum 302 has a groove 1004 around its outer surface at a specified vertical position along the drum 302 (e.g., around the center of the drum 302). The groove 1004 may be detected by the confocal chromatic sensor 200 to align the vertical positions of the sensor head 206 and the drum 302. This alignment, based on detection of the groove 1004 by the confocal chromatic sensor 200, is performed, for example, during calibration and/or at the beginning of operation of the EUV light source 1000.

In some embodiments, the confocal chromatic sensor 200 measures distances from the confocal chromatic sensor 200 to the drum 302. The sensor head 206, as disposed within the vacuum chamber 304, focuses the light 312 onto the onto the drum 302 and detects the corresponding light reflected from the drum 302. The light 312 is broadband (e.g., white) light that has been dispersed into different wavelengths (e.g., into colors 208-218, FIG. 2). The wavelengths of the light reflected from the drum 302 and detected by the sensor head 206 correspond to, and are used to determine, the distance from the confocal chromatic sensor 200 (e.g., from the sensor head 206) to the drum 302. Distances from the confocal chromatic sensor 200 (e.g., from the sensor head 206) to the drum 302, as measured by the confocal chromatic sensor 200, include first distances from the confocal chromatic sensor 200 (e.g., from the sensor head 206) to respective portions of the bare outer surface of the drum 302 before the drum 302 is coated with the Xe ice 316 (as in FIGS. 3A and 4A) and/or second distances from the confocal chromatic sensor 200 (e.g., from the sensor head 206) to respective portions of an outer surface of the Xe ice 316 when the drum 302 is coated with the Xe ice 316 (as in FIGS. 3B and 4B). The distances from the confocal chromatic sensor 200 (e.g., from the sensor head 206) to different portions of the bare outer surface of the drum 302 may vary due to surface roughness (i.e., a lack of surface uniformity) for the bare outer surface of the drum 302. The distances from the confocal chromatic sensor 200 (e.g., from the sensor head 206) to different portions of the outer surface of the Xe ice 316 may vary due to variations in the thickness of the Xe ice 316 and/or surface roughness for the bare outer surface of the drum 302. Thicknesses of respective portions of the Xe ice 316 may be determined by subtracting respective first distances from respective second distances: the thickness of a particular portion of the Xe ice 316 equals the difference between the second distance for that portion and the first distance for that portion. In this manner, variations in the thickness of the Xe ice 316 on the drum 302 are identified. The distances and thicknesses may be calculated by a computer system associated with the EUV light source 300 or 400 (e.g., by the computer system of the EUV light-source system 900, FIG. 9).

The thickness of the Xe ice 316 (e.g., the respective thicknesses of the respective portions of the Xe ice 316) is one example of a parameter for the drum 302 that may be measured using the confocal chromatic sensor 200. Other examples include roughness of the Xe ice 316 and reflectivity of the Xe ice 316. On a large (e.g., global) scale for the drum 302, roughness may be measured by measuring the second distances from the confocal chromatic sensor 200 (e.g., from the sensor head 206) to respective portions of an outer surface of the Xe ice 316 when the drum 302 is coated with the Xe ice 316 (as in FIGS. 3B and 4B). The variation of the second distances provides an indication of the roughness of the Xe ice. On a smaller, local scale, the confocal chromatic sensor 200 may provide an indication of the roughness within a particular portion of the Xe ice 316 (e.g., with the particular portion corresponding to a particular measurement sample for the confocal chromatic sensor 200). The confocal chromatic sensor 200 may provide indications of reflectivities for respective portions of the Xe ice 316 (e.g., with a particular portion corresponding to a particular measurement sample for the confocal chromatic sensor 200). In these manners, variation and/or absolute values of thickness, roughness, and reflectivity for the Xe ice 316 may be monitored using the confocal chromatic sensor 200. The roughness and reflectivity values, like the distances and thicknesses, may be calculated by the computer system associated with the EUV light source 300 or 400 (e.g., by the computer system of the EUV light-source system 900, FIG. 9).

Parameters measured using the confocal chromatic sensor 200 (e.g., thicknesses, roughness, and/or reflectivities of the Xe ice 316) may be used to provide real-time feedback to control operation of the EUV light source 400. For example, the laser beam that illuminates the drum 302 (e.g., laser beam 103, FIG. 1) may be shut off (e.g., by deactivating the laser that generates it or by dumping the laser beam) in response to detection of a defect in the Xe ice 316 (e.g., a crater in the Xe ice 316, the crater being an area that has inadequate thickness and causes excessive roughness). A defect is detected and the laser beam shut off, for example, if the thickness of one or more portions of the Xe ice 316 (i.e., one or more thicknesses of one or more respective portions of the Xe ice 316) does not satisfy a threshold (e.g., is less than, or less than or equal to, a minimum thickness), if the roughness of the Xe ice 316 (or one or more portions of the Xe ice 316) satisfies a threshold (e.g., exceeds, or equals or exceeds, a maximum roughness), and/or if the reflectivity of one or more portions of the Xe ice 316 (i.e., one or more reflectivities of one or more respective portions of the Xe ice 316) is not within a specified range (e.g., either is less than, or less than or equal to, a minimum reflectivity or is greater than, or greater than or equal to, a maximum reflectivity, wherein the range is between the minimum reflectivity and the maximum reflectivity). The decision whether to shut off the laser beam may be made by the computer system associated with the EUV light source 300 or 400 (e.g., by the computer system of the EUV light-source system 900, FIG. 9).

Once the laser beam has been shut off, parameters measured using the confocal chromatic sensor 200 (e.g., thicknesses, roughness, and/or reflectivities of the Xe ice 316) may be used to determine whether to reactivate the laser beam. For example, the laser beam may be reactivated in response to determining that the detected defect(s) have been eliminated (e.g., through regrowth of the Xe ice 316 on the drum 302). For example, the laser beam is reactivated in response to determining that the thickness of the Xe ice 316 (e.g., the thicknesses of the respective portions of the Xe ice 316) satisfies a threshold (e.g., is greater than, or greater than or equal to, the minimum thickness), the roughness of the Xe ice 316 (or the respective portions of the Xe ice 316) does not satisfy a threshold (e.g., is less than, or less than or equal to, the maximum roughness), and/or the reflectivities of the respective portions of the Xe ice 316 are in the specified range (e.g., exceed, or equal or exceed, the minimum reflectivity and are less than, or less than or equal to, the maximum reflectivity). The decision whether to reactivate the laser beam may be made by the computer system associated with the EUV light source 300 or 400 (e.g., by the computer system of the EUV light-source system 900, FIG. 9).

In some embodiments, the drum 302 is qualified for use, at least in part, by measuring the roughness of its bare outer surface. For example, the first distances from the confocal chromatic sensor 200 (e.g., from the sensor head 206) to respective portions of the bare outer surface of the drum 302 are measured and their variation analyzed. Their variation is an indication of surface roughness for the outer surface of the drum 302. Based on their variation (e.g., the difference between the maximum and minimum value, the standard deviation, etc.), a decision is made as to whether the drum 302 is suitable for use. The drum 302 is considered suitable for use, and thus qualified, if the variation in the first distances does not satisfy a threshold (e.g., is less than, or less than or equal to a maximum variation). In some embodiments, the computer system associated with the EUV light source 300 or 400 (e.g., the computer system of the EUV light-source system 900, FIG. 9) determines that the EUV light source 300 or 400 is suitable for use, and authorizes activation of the EUV light source 300 or 400, based at least in part on this determination (and thus based at least in part on the roughness of the bare outer surface of the drum 302). The drum 302 may be considered defective if the variation (and thus the roughness of the bare outer surface of the drum) satisfies the threshold (e.g., exceeds, or equals or exceeds, the maximum variation).

In some embodiments, maintenance for the EUV light source 300 or 400 is triggered (e.g., scheduled, or mandated before operation can begin or continue) in response to detection of a defect in the Xe ice 316 or on the drum 302.

In general, the results of measuring one or more parameters for the drum 302 using the confocal chromatic sensor 200 may be used to improve (e.g., optimize) other process parameters for the EUV light source 300 or 400.

Figure 5:
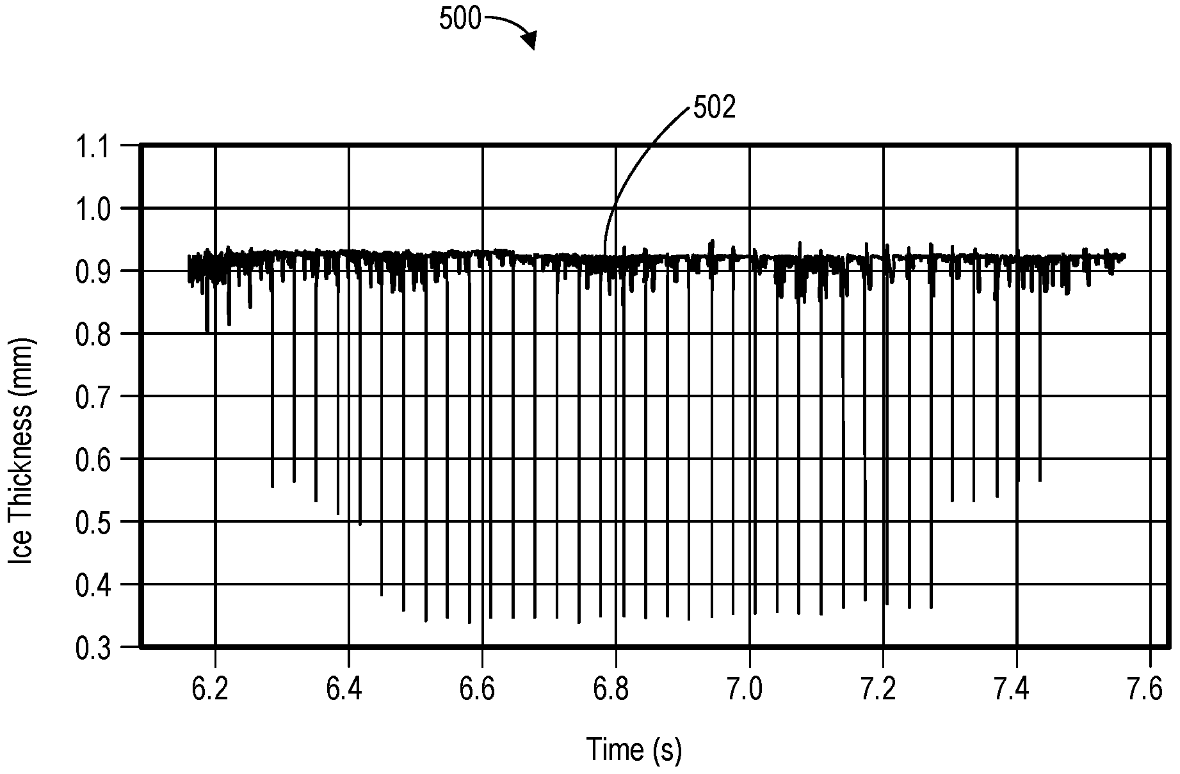
FIG. 5 is a graph showing time-trace data for the thickness of Xe ice on a rotatable and translatable drum, in accordance with some embodiments.

FIG. 5 is a graph 500 showing time-trace data 502 for the thickness of Xe ice 316 on a drum 302, in accordance with some embodiments. The time-trace data 502 were generating using a confocal chromatic sensor 200 attached to an EUV light-source system with the drum 302. The x-axis of the graph 500 is time measured in seconds and the y-axis of the graph 500 is thickness of the Xe ice 316 measured in millimeters. The thickness values for the time-trace data 502 are obtained using a confocal chromatic sensor 200 (e.g., as described for FIGS. 3A-3B and 4A-4B). The thickness of the Xe ice 316 on most of the drum 302 remains steady at just over 0.9 mm, but a particular portion (i.e., region) of the Xe ice 316 on the drum 302 has a lower thickness. This particular portion may be a crater in the Xe ice 316. The low thickness is measured repeatedly as the drum 302 rotates and translates, resulting in repeated instances of a low measured thickness in the time-trace data 502 over time. The low thickness drops from about 0.8 mm at 6.2 sec to about 0.35 mm at about 6.5 sec, remains steady at that thickness until about 7.3 sec, and then recovers to 0.9 mm shortly after 7.4 sec. The low thickness of the Xe ice 316 between approximately 6.3 and 7.4 sec amounts to a defect in the Xe ice 316. FIG. 5 thus illustrates formation and subsequent elimination of a defect in the Xe ice 316.

Figure 6:
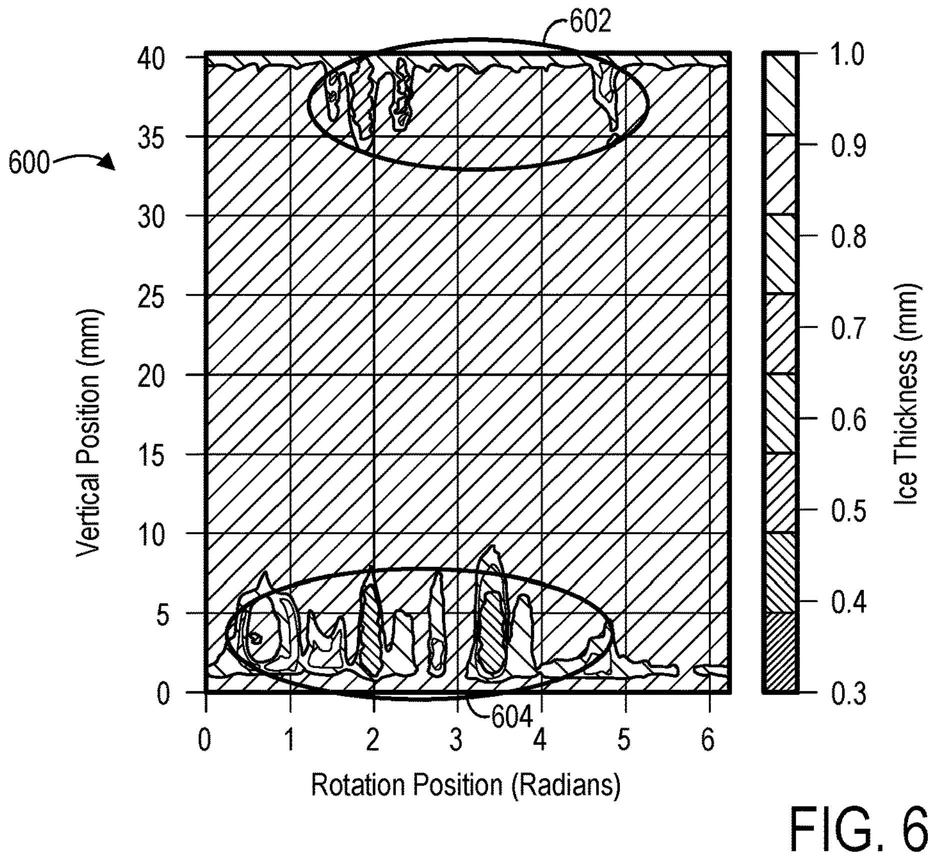
FIGS. 6 and 7 are graphs showing variation in the thickness of Xe ice on a rotatable and translatable drum, in accordance with some embodiments.
Figure 7:
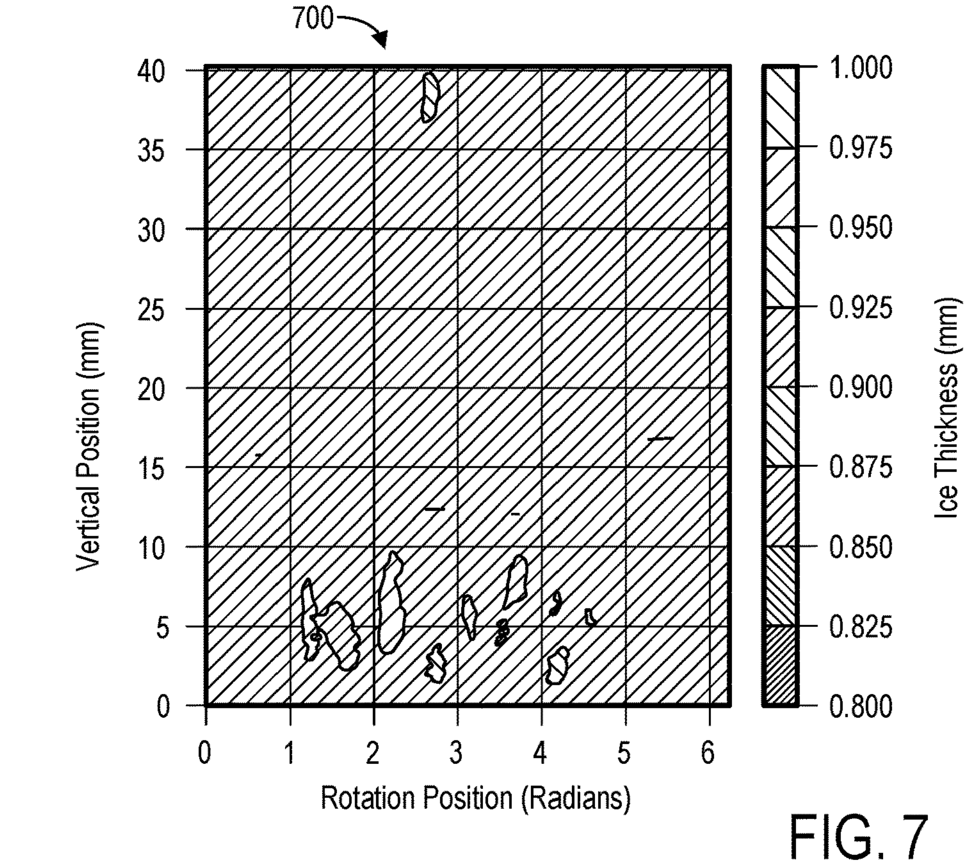

FIGS. 6 and 7 are respective graphs 600 and 700 showing variation in the thickness of Xe ice 316 on an instance of a drum 302, in accordance with some embodiments. The data in the graphs 600 and 700 were generating using a confocal chromatic sensor 200 attached to an EUV light-source system with the drum 302. The graphs 600 and 700 show thicknesses of Xe ice 316 for respective portions of the drum 302 as defined by respective rotational positions (in radians) and vertical positions (in millimeters) on the drum 302. Each of the graphs 600 and 700 is for a distinct point in time. The rotational positions are shown on the x-axes of the graphs 600 and 700, and the vertical positions are shown on the y-axes of the graphs 600 and 700. Data for the graphs 600 and 700 are obtained using a confocal chromatic sensor 200 (e.g., as described for FIGS. 3A-3B and 4A-4B) while the drum 302 is being illuminated with a laser beam to generate a plasma (and thus to generate EUV light).

The Xe ice 316 on most of the drum 302 has a thickness of approximately 0.9 mm. Some portions on the top and bottom of the drum 302, however, have lower thicknesses. Portions 602 on the top of the drum 302 and portions 604 on the bottom of the drum 302 have thicknesses as low as approximately 0.4 mm. The portions 602 and 604 with these low thicknesses amount to defects. In response to detection of these defects (e.g., as described above for FIGS. 3A-3B and 4A-4B), the laser beam may be shut off, allowing the Xe ice 316 to regrow, and thus thicken, in the portions 602 and 604. FIG. 7 shows the results of this regrowth: the thicknesses of the Xe ice 316 in the portions 602 and 604 (FIG. 6) have increased in FIG. 7 to the point where they are no longer considered defective.

Figure 8A:
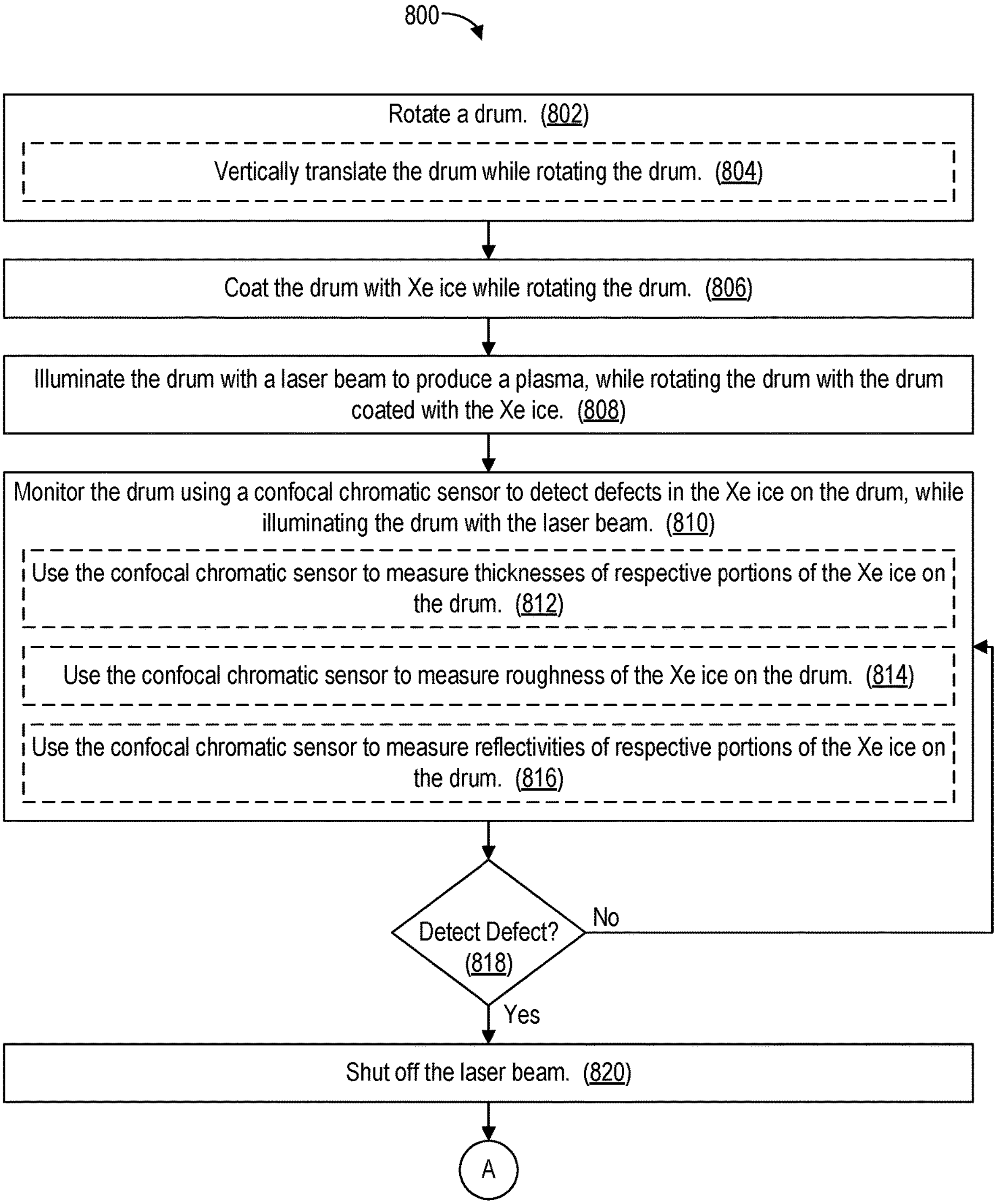
FIGS. 8A and 8B show a flowchart of a method of operating a light source in accordance with some embodiments.
Figure 8B:
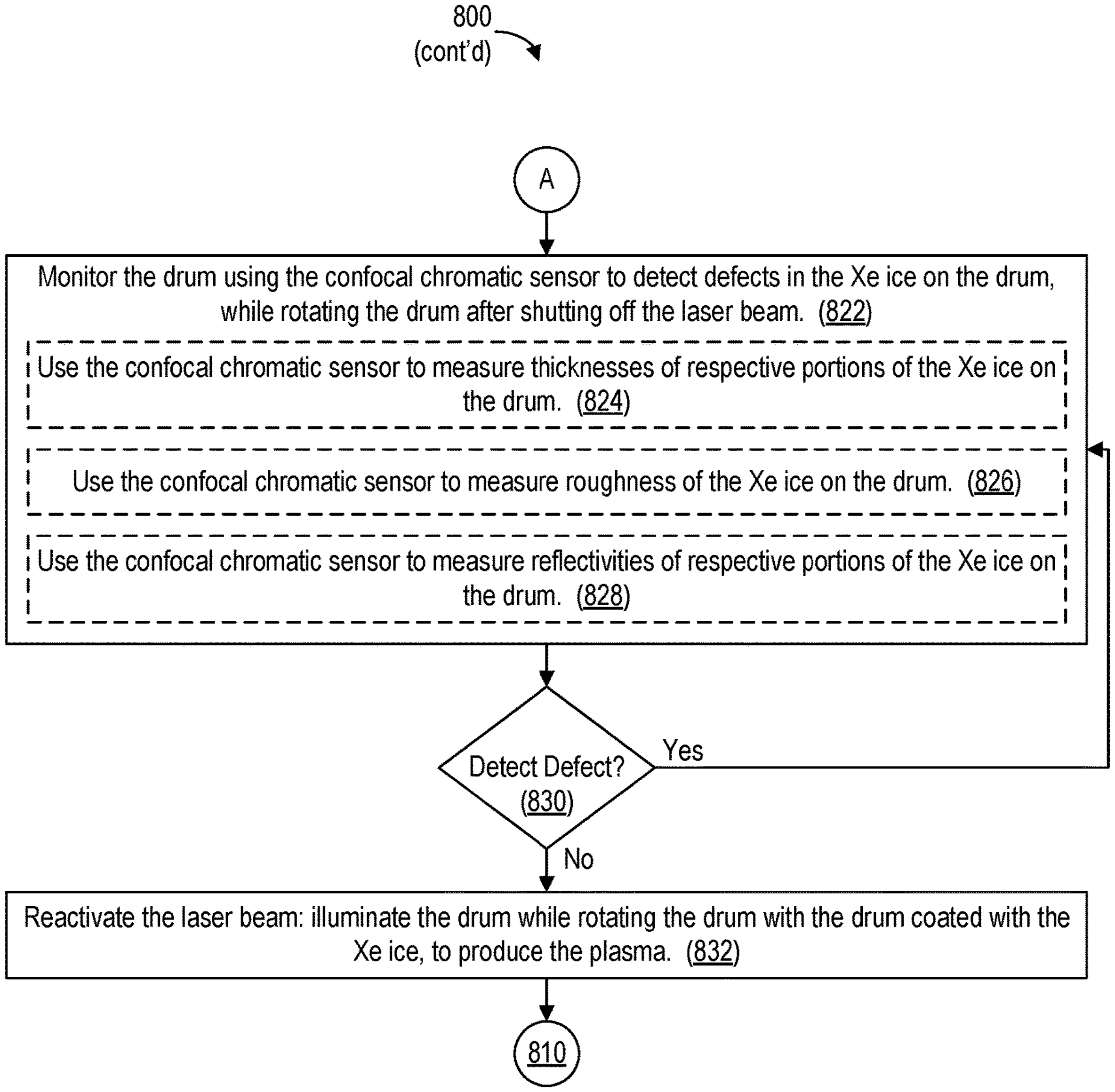

FIGS. 8A and 8B show a flowchart of a method 800 of operating a light source (e.g., EUV light source 100, FIG. 1; 300, FIGS. 3A-3B; 400, FIGS. 4A-4B) in accordance with some embodiments. In the method 800, a drum (e.g., drum 118, FIG. 1; drum 302, FIGS. 3A-4B) is rotated (802, FIG. 8A). In some embodiments, the drum is vertically translated (804) while being rotated. The drum is coated (806) with Xe ice while being rotated (e.g., and while being vertically translated). While being rotated (e.g., and vertically translated) and while coated with the Xe ice, the drum is illuminated (808) with a laser beam (e.g., laser beam 103, FIG. 1) to produce a plasma.

While being illuminated with the laser beam, the drum is monitored (810) using a confocal chromatic sensor (e.g., confocal chromatic sensor 200, FIGS. 2-4B) to detect defects in the Xe ice on the drum. In some embodiments, the confocal chromatic sensor is used (812) to measure thicknesses of respective portions of the Xe ice on the drum (e.g., as described for FIGS. 3A-3B and 4A-4B). In some embodiments (e.g., in addition to or alternatively to step 812), the confocal chromatic sensor is used (814) to measure roughness of the Xe ice on the drum. In some embodiments (e.g., in addition to or alternatively to steps 812 and/or 814), the confocal chromatic sensor is used (816) to measure reflectivities of respective portions of the Xe ice on the drum (i.e., to measure the reflectivity of the respective portions).

Monitoring the drum is performed to detect defects in the Xe ice. If no defects are detected (818—No), the monitoring continues (810). If a defect is detected (818—Yes), however, the laser beam is shut off (820) in response to detecting the defect. The drum continues to be rotated, translated, and/or coated with Xe ice while the laser beam is shut off, in accordance with steps 802, 804, and/or 806, to allow the Xe ice to regrow properly on the drum.

After shutting off the laser beam, the drum is monitored (822, FIG. 8B) using the confocal chromatic sensor to detect defects in the Xe ice on the drum, while rotating the drum (e.g., and translating the drum and coating the drum with Xe ice). In some embodiments, the confocal chromatic sensor is used (824) to measure thicknesses of respective portions of the Xe ice on the drum (e.g., as described for FIGS. 3A-3B and 4A-4B). In some embodiments (e.g., in addition to or alternatively to step 824), the confocal chromatic sensor is used (826) to measure roughness of the Xe ice on the drum. In some embodiments (e.g., in addition to or alternatively to steps 824 and 826), the confocal chromatic sensor is used (828) to measure reflectivities of respective portions of the Xe ice on the drum (i.e., to measure the reflectivity of the respective portions).

Monitoring (822) the drum after shutting off the laser beam has been shut off is performed to determine whether the detected defect has been eliminated (e.g., through regrowth of Xe ice) and whether any other defects are present. If a defect is detected (830—Yes), then monitoring (822) of the drum continues while the drum is rotated (802), translated (804), and/or coated (806) with Xe ice, with the laser beam still shut off. If no defect is detected (830—No), however, then the laser beam is reactivated (832) in response to detecting the absence of defects in the Xe ice on the drum: the drum is once again illuminated with the laser beam while being rotated (802) and/or translated (804) with the drum coated with the Xe ice (e.g., while coating (806) the drum with Xe ice). Operation of the method 800 reverts to step 810 (FIG. 8A).

In some embodiments, the drum is mounted on a motorized translation stage (e.g., motorized translation stage 1002, FIGS. 10A-10B). During the monitoring of steps 810 and 822, the motorized translation stage may be translated to align the confocal chromatic sensor with a laser spot at which the laser beam illuminates the Xe ice (e.g., to detect new craters in the Xe ice).

The method 800 thus allows operation of an EUV light source to be controlled in response to real-time feedback from a confocal chromatic sensor. The real-time feedback provides indications of the quality of the Xe ice on the drum and allows for determinations to be made in real-time whether to continue operation of the EUV light source or allow the coating of Xe ice on the drum to rebuild.

While FIG. 8 shows the operations of the method 800 in a specific order, performance of the operations may overlap. For example, steps 802, 804, and/or 806 may be performed throughout the method 800, and steps 808 and 810 may be performed at the same time. The method 800 can include more or fewer operations. Two or more operations may be combined into a single operation.

Figure 9:
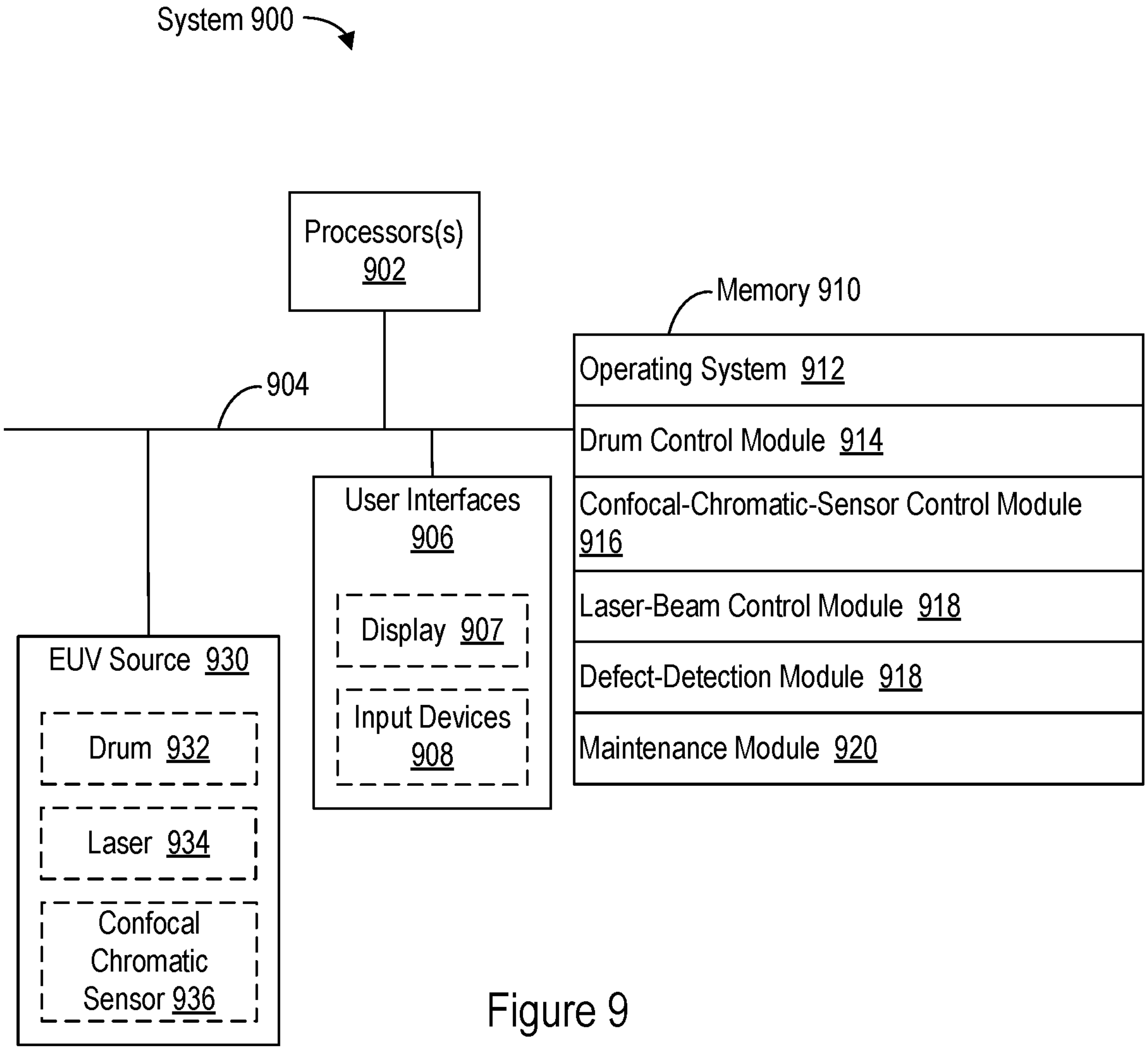
FIG. 9 is a block diagram of an EUV light-source system in accordance with some embodiments.

FIG. 9 is a block diagram of an EUV light-source system 900 in accordance with some embodiments. The system 900 includes an EUV light source 930 (e.g., EUV light source 100, FIG. 1; 300, FIGS. 3A-3B; 400, FIGS. 4A-4B), which includes a drum 932 (e.g., drum 118, FIG. 1; drum 302, FIGS. 3A-4B), laser 934 (e.g., to produce the laser beam 103, FIG. 1), and confocal chromatic sensor 936 (e.g., confocal chromatic sensor 200, FIGS. 2-4B). The confocal chromatic sensor 936 may be mounted on a motorized translation stage (e.g., motorized translation stage 1002, FIGS. 10A-10B). The system 900 also includes a computer system communicatively coupled with the EUV light source 930. The computer system includes one or more processors 902 (e.g., CPUs), optional user interfaces 906, memory 910, and communication bus(es) 904 interconnecting these components. In some embodiments, the EUV light source 930 is communicatively coupled to the computer system through one or more wired and/or wireless networks. The computer system may further include one or more wired and/or wireless network interfaces for communicating with the EUV light source 930 and/or remote computer systems.

The user interfaces 906 may include a display 907 and one or more input devices 908 (e.g., a keyboard, mouse, touch-sensitive surface of the display 907, etc.). The display 907 may display the status of the EUV light source 930, including results of monitoring the drum 932 with the confocal chromatic sensor 936. For example, the display 907 may display graphs similar to the graphs 500 (FIG. 5), 600 (FIG. 6), and/or 700 (FIG. 7).

Memory 910 includes volatile and/or non-volatile memory. Memory 910 (e.g., the non-volatile memory within memory 910) includes a non-transitory computer-readable storage medium. Memory 910 optionally includes one or more storage devices remotely located from the processors 902 and/or a non-transitory computer-readable storage medium that is removably inserted into the computer system of the system 900. The memory 910 (e.g., the non-transitory computer-readable storage medium of the memory 910) includes instructions for achieving the functionality described herein (e.g., the functionality described for FIGS. 3A-3B and 4A-4B). For example, the memory 910 (e.g., the non-transitory computer-readable storage medium of the memory 910) includes instructions for performing the method 800 (FIGS. 8A-8B).

In some embodiments, memory 910 (e.g., the non-transitory computer-readable storage medium of memory 910) stores the following modules and data, or a subset or superset thereof: an operating system 912 that includes procedures for handling various basic system services and for performing hardware-dependent tasks, a drum control module 914 for controlling rotation and translation of the drum 932, a confocal-chromatic-sensor control module 916 for controlling and receiving data from the confocal chromatic sensor 936 (e.g., and for controlling a motorized translation stage on which the confocal chromatic sensor 936 is mounted), a laser-beam control module 918 for controlling the laser 934 and corresponding laser beam that illuminates the Xe-ice-coated drum 932 (e.g., for shutting off and reactivating the laser beam), a defect-detection module 918 for detecting defects in the Xe ice on the drum 932 using data from the confocal chromatic sensor 936, and a maintenance module 920 for triggering (e.g., scheduling or mandating) maintenance for the EUV light source 930.

Each of the modules stored in the memory 910 corresponds to a set of instructions, to be executed by the one or more one or more processors 902, for performing one or more functions described herein. Separate modules need not be implemented as separate software programs. The modules and various subsets of the modules may be combined or otherwise re-arranged. In some embodiments, the memory 910 stores a subset or superset of the modules and/or data structures identified above.

FIG. 9 is intended more as a functional description of various features that may be present in an EUV light-source system than as a structural schematic. For example, the functionality of the computer system in the EUV light-source system 900 may be split between multiple devices. A portion of the modules stored in the memory 910 may alternatively be stored in one or more other computer systems communicatively coupled with the computer system of the EUV light-source system 900 through one or more networks.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A light source, comprising:

a rotatable drum to be coated with xenon (Xe) ice and illuminated by a laser beam to produce a plasma;

a confocal chromatic sensor to measure distances from the confocal chromatic sensor to the rotatable drum;

one or more processors; and memory storing one or more programs for execution by the one or more processors, the one or more programs comprising instructions for:

detecting defects in the Xe ice on the rotatable drum using the confocal chromatic sensor when the rotatable drum is coated with the Xe ice; and shutting off the laser beam in response to detecting a defect in the Xe ice on the rotatable drum using the confocal chromatic sensor.

2. The light source of claim 1, further comprising a vacuum chamber, wherein:

the rotatable drum is disposed within the vacuum chamber; and the confocal chromatic sensor comprises a sensor head, disposed within the vacuum chamber, to focus light onto the rotatable drum and to detect reflected light from the rotatable drum.

3. The light source of claim 2, wherein the confocal chromatic sensor further comprises a controller, disposed outside the vacuum chamber, to control operation of the confocal chromatic sensor and to generate broadband light to be provided to the sensor head.

4. The light source of claim 3, wherein the confocal chromatic sensor further comprises an optical fiber, coupled between the sensor head and the controller, to provide the broadband light to the sensor head, wherein:

the vacuum chamber comprises a wall having a feed-through; and the optical fiber passes through the feed-through.

5. The light source of claim 2, further comprising a casing within the vacuum chamber, wherein:

the rotatable drum is disposed within the casing;

the sensor head is disposed outside the casing; and the casing comprises a window situated between the rotatable drum and the sensor head.

6. The light source of claim 2, wherein the distances from the confocal chromatic sensor to the rotatable drum to be measured by the confocal chromatic sensor comprise:

first distances from the sensor head to respective portions of a bare outer surface of the rotatable drum before the rotatable drum is coated with the Xe ice; and second distances from the sensor head to respective portions of an outer surface of the Xe ice when the rotatable drum is coated with the Xe ice.

7. The light source of claim 1, wherein:

the instructions for detecting defects comprise instructions for:

measuring thicknesses of respective portions of the Xe ice on the rotatable drum using the confocal chromatic sensor, and determining whether the thicknesses of the respective portions of the Xe ice on the rotatable drum satisfy a threshold; and the instructions for shutting off the laser beam comprise instructions for shutting off the laser beam in response to determining that one or more thicknesses of one or more respective portions of the Xe ice on the rotatable drum do not satisfy the threshold.

8. The light source of claim 7, further comprising a vacuum chamber, wherein:

the rotatable drum is disposed within the vacuum chamber;

the confocal chromatic sensor comprises a sensor head, disposed within the vacuum chamber, to focus light onto the rotatable drum and to detect reflected light from the rotatable drum; and the instructions for measuring thicknesses of the respective portions of the Xe ice on the rotatable drum comprise instructions for:

measuring first distances from the sensor head to respective portions of a bare outer surface of the rotatable drum using the confocal chromatic sensor before the rotatable drum is coated with the Xe ice, measuring second distances from the sensor head to respective portions of an outer surface of the Xe ice using the confocal chromatic sensor when the rotatable drum is coated with the Xe ice, and subtracting respective first distances from respective second distances.

9. The light source of claim 1, wherein:

the instructions for detecting defects comprise instructions for:

measuring roughness of the Xe ice on the rotatable drum using the confocal chromatic sensor, and determining whether the roughness satisfies a threshold; and the instructions for shutting off the laser beam comprise instructions for shutting off the laser beam in response to determining that the roughness satisfies the threshold.

10. The light source of claim 9, wherein:

the instructions for determining whether the roughness satisfies the threshold comprise instructions for identifying a crater in the Xe ice on the rotatable drum using the confocal chromatic sensor; and the instructions for shutting off the laser beam in response to determining that the roughness satisfies the threshold comprise instructions for shutting off the laser beam in response to identifying the crater.

11. The light source of claim 1, wherein:

the instructions for detecting defects comprise instructions for:

measuring reflectivities of respective portions of the Xe ice on the rotatable drum using the confocal chromatic sensor, and determining whether the reflectivities of the respective portions of the Xe ice on the rotatable drum are within a specified range; and the instructions for shutting off the laser beam comprise instructions for shutting off the laser beam in response to determining that one or more reflectivities of one or more respective portions of the Xe ice on the rotatable drum are not within the specified range.

12. The light source of claim 1, wherein the one or more programs further comprise instructions for:

monitoring the rotatable drum for defects in the Xe ice using the confocal chromatic sensor after shutting off the laser beam in response to detecting the defect; and reactivating the laser beam in response to identifying an absence of defects in the Xe ice on the rotatable drum.

13. The light source of claim 12, wherein:

the instructions for monitoring the rotatable drum comprise instructions for:

measuring thicknesses of respective portions of the Xe ice on the rotatable drum using the confocal chromatic sensor, and determining whether the thicknesses of the respective portions of the Xe ice on the rotatable drum satisfy a threshold; and the instructions for reactivating the laser beam comprise instructions for reactivating the laser beam based at least in part on a determination that the thicknesses satisfy the threshold.

14. The light source of claim 12, wherein:

the instructions for monitoring the rotatable drum comprise instructions for:

measuring roughness of the Xe ice on the rotatable drum using the confocal chromatic sensor, and determining whether the roughness satisfies a threshold; and the instructions for reactivating the laser beam comprise instructions for reactivating the laser beam based at least in part on a determination that the roughness does not satisfy a threshold.

15. The light source of claim 12, wherein:

the instructions for monitoring the rotatable drum comprise instructions for:

measuring reflectivities of respective portions of the Xe ice on the rotatable drum using the confocal chromatic sensor, and determining whether the reflectivities of the respective portions of the Xe ice on the rotatable drum are within a specified range; and the instructions for reactivating the laser beam comprise instructions for reactivating the laser beam based at least in part on a determination that the reflectivities of the respective portions of the Xe ice on the rotatable drum are within the specified range.

16. The light source of claim 1, wherein the one or more programs further comprise instructions for triggering maintenance based at least in part on detecting the defect in the Xe ice on the rotatable drum.

17. The light source of claim 1, wherein the one or more programs further comprise instructions for:

measuring roughness of a bare outer surface of the rotatable drum before the rotatable drum is coated with the Xe ice; and determining whether the rotatable drum is suitable for use, based at least in part on the roughness.

18. A light source, comprising:

a rotatable drum to be coated with xenon (Xe) ice and illuminated by a laser beam to produce a plasma;

a confocal chromatic sensor to measure distances from the confocal chromatic sensor to the rotatable drum;

a motorized translation stage;

one or more processors; and memory storing one or more programs for execution by the one or more processors, wherein:

the confocal chromatic sensor comprises a sensor head mounted on the motorized translation stage; and the one or more programs comprise instructions for translating the motorized translation stage to align the sensor head with a laser spot at which the laser beam illuminates the Xe ice.

19. The light source of claim 18, wherein:

the rotatable drum has a groove around its outer surface; and the one or more programs further comprise instructions for aligning vertical positions of the rotatable drum and the sensor head based on detection of the groove by the confocal chromatic sensor.

20. A method of operating a light source, comprising:

rotating a drum;

while rotating the drum, coating the drum with xenon (Xe) ice;

while rotating the drum with the drum coated with the Xe ice, illuminating the drum with a laser beam to produce a plasma;

while illuminating the drum with the laser beam, monitoring the drum using a confocal chromatic sensor to detect defects in the Xe ice on the drum; and in response to detecting a defect in the Xe ice on the drum, shutting off the laser beam.

21. The method of claim 20, wherein monitoring the drum comprises using the confocal chromatic sensor to measure a parameter selected from the group consisting of thicknesses of respective portions of the Xe ice on the drum, roughness of the Xe ice on the drum, and reflectivities of respective portions of the Xe ice on the drum.

22. The method of claim 20, further comprising:

while rotating the drum after shutting off the laser beam, monitoring the drum using the confocal chromatic sensor to detect defects in the Xe ice on the drum; and in response to detecting an absence of defects in the Xe ice on the drum, reactivating the laser beam to illuminate the drum while rotating the drum with the drum coated with the Xe ice, to produce the plasma.

* * * * *